United States Patent
Wenning

[11] Patent Number: 6,156,863
[45] Date of Patent: Dec. 5, 2000

[54] UREA- AND URETDIONE-FUNCTIONAL POLYISOCYANATES

[75] Inventor: Andreas Wenning, Nottuln, Germany

[73] Assignee: Huels Aktiengesellschaft, Marl, Germany

[21] Appl. No.: 09/292,374

[22] Filed: Apr. 15, 1999

[30] Foreign Application Priority Data

Apr. 15, 1998 [DE] Germany .......................... 198 16 547

[51] Int. Cl.$^7$ ................................................. C08G 18/80
[52] U.S. Cl. .............................. 528/45; 528/73; 525/123; 525/124; 252/182.21; 540/202
[58] Field of Search ........................ 528/45, 73; 525/123, 525/124; 252/182.21; 540/202

[56] References Cited

U.S. PATENT DOCUMENTS

| | | | |
|---|---|---|---|
| 3,998,794 | 12/1976 | Müller et al. .............................. | 528/73 |
| 5,847,067 | 12/1998 | Gras .......................................... | 528/45 |
| 5,883,249 | 3/1999 | Wolf ......................................... | 540/356 |

FOREIGN PATENT DOCUMENTS

| | | |
|---|---|---|
| 0 825 215 | 2/1998 | European Pat. Off. |
| 2 298 566 | 8/1976 | France . |
| 195 46 750 | 6/1997 | Germany . |

*Primary Examiner*—Rachel Gorr
*Attorney, Agent, or Firm*—Oblon, Spivak, McClelland, Maier & Neustadt, P.C.

[57] ABSTRACT

A urea- and uretdione-functional polyaddition compound having free, partially or totally blocked isocyanate groups and having the following structure:

(UR-DA)

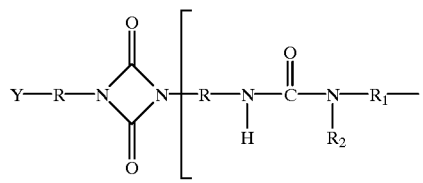

-continued

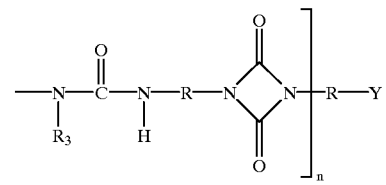

wherein the substituents are defined as follows:

Y: —NCO,

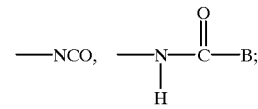

B:

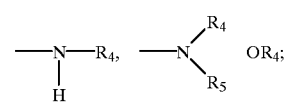

R:

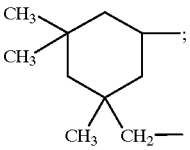

n: 1–20;

n: 1–20;

$R_1$ is R or a linear, branched or cyclic alkylene or phenylene radicals having 2–16 carbon atoms;

$R_2$, $R_3$ are each H, $R_4$ or a

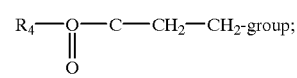

$R_4$, $R_5$ are each identical or different hydrocarbon radicals having 1-14 carbon atoms;

prepared by reacting isophorone diisocyanate-uretdione with diamine mixtures comprising 1–60 mol % diprimary diamines, 1–98 mol % primary/secondary diamines and 1–98 mol % disecondary diamines.

24 Claims, No Drawings

UREA- AND URETDIONE-FUNCTIONAL POLYISOCYANATES

BACKGROUND OF THE INVENTION

1. Field of the Invention

The present invention relates to polyaddition compounds which contain urea groups and uretdione groups and which have free or partially or totally blocked isocyanate groups, to a process for their preparation and to the powdered polyurethane coating materials prepared from them, and to coatings having a matte surface.

2. Description of the Background

There has long been an increasing interest in powder coating materials which produce a matte surface. The reason for this is first and foremost practical. Glossy surfaces require a far higher degree of cleaning than do matte surfaces. In addition, it may be desirable for safety reasons to avoid strongly reflecting surfaces.

The most simple principle of obtaining a matte surface is to admix smaller or larger amounts of a filler such as chalk, finely divided silica or barium sulfate, into the powder coating material in accordance with the extent of the desired matt effect. However, such additions bring about a deterioration in the film properties of the coating, such as adhesion, flexibility, impact strength and chemical resistance.

The addition of substances incompatible with the coating material, such as waxes or cellulose derivatives, for example, does give rise, it is true, to matting, but slight changes in the course of extrusion lead to fluctuations in the surface gloss. The reproducibility of the matte effect is not ensured.

Urea- and uretdione-functional polyisocyanates have become known only in relatively recent times. DE-A 195 46 750 discloses reaction products of isophorone diisocyanate-uretdione and disecondary diamines as curing agents for producing polyurethane (PU) coatings with glossy surfaces.

DE-A 196 30 844 is the first patent application to describe matte PU powder coating materials which comprise urea-functional isophorone diisocyanate-uretdiones as a curing component. They are prepared by reacting uretdiones with water. Intermediates which form during this reaction, with the elimination of carbon dioxide, are primary amines, which react with remaining isocyanate groups to form ureas. The nitrogen atoms of the urea groups are each monosubstituted. Reactions of polyisocyanates with water are difficult to reproduce because of the formation of by-products.

DE A 196 37 375 describes PU powder coating materials which are formulated for a matting effect by means of urea-functional isophorone diisocyanate-uretdiones as curing agents. These curing agents are formed by the reaction of isophorone diisocyanate-uretdione with disecondary diamines. The disecondary diarnines are reaction products of diprimary diamines and maleic or fumaric esters.

DE A 196 37 377 discloses and claims uretdione- and urea-functional polyaddition products as a curing component for matting PU powder coating materials. These curing agents are prepared by the reaction of isophorone diisocyanate-uretdione with diamines which contain one primary and secondary amino group. Preparation of the pure diamines is in some cases complex and very costly.

SUMMARY OF THE INVENTION

Accordingly, one object of the present invention is to provide a urea- and uretdione-functional polyaddition compound which provides coatings of improved matte appearance.

Briefly, this object and other objects of the present invention as hereinafter will become more readily apparent and be attained by a urea- and uretdione-functional polyaddition compound having free, partially or totally blocked isocyanate groups and the following composition:

(UR-DA)

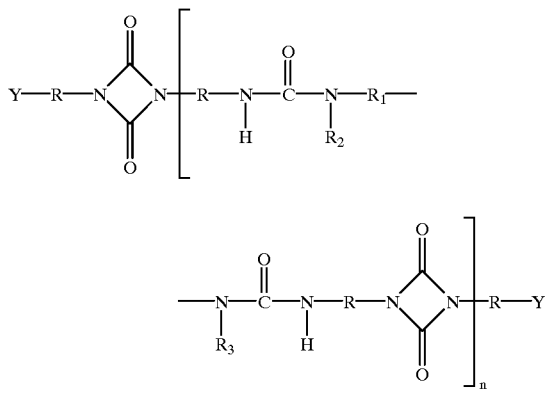

where the substituents are defined as follows

Y:

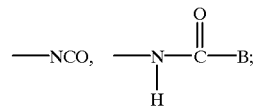

B:

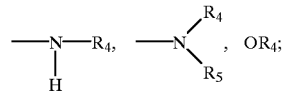

R:

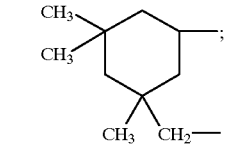

n: 1–20.

$R_1$: R or linear, branched or cyclic alkylene or phenylene radicals having 2–16 carbon atoms;

$R_2$, $R_3$: H, $R_4$ or a

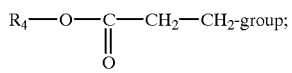

$R_4$, $R_5$: identical or different hydrocarbon radicals having 1–14 carbon atoms; prepared by reacting isophorone diisocyanate-uretdione with diamine mixtures comprising 1–60 mol % diprimary diamines, 1–98 mol % primary/secondary diamines and 1–98 mol % disecondary diamines.

DETAILED DESCRIPTION OF THE PREFERRED EMBODIMENTS

Surprisingly, PU powder coating materials for matte coatings have now been found which are not hampered by the disadvantages described above if the curing component employed for the PU powder coating materials comprises polyaddition compounds of isophorone diisocyanate-uretdione (IPDI uretdione for short) and mixtures of diprimary, primary/secondary and disecondary diamines.

The diamine mixtures preferably comprise at least 1 mol % diprimary diamines, at least 30 mol % primary/secondary diamines and at least 1 mol % disecondary diamines.

The present invention also provides a process for preparing the compounds of the invention in accordance with the following reaction:

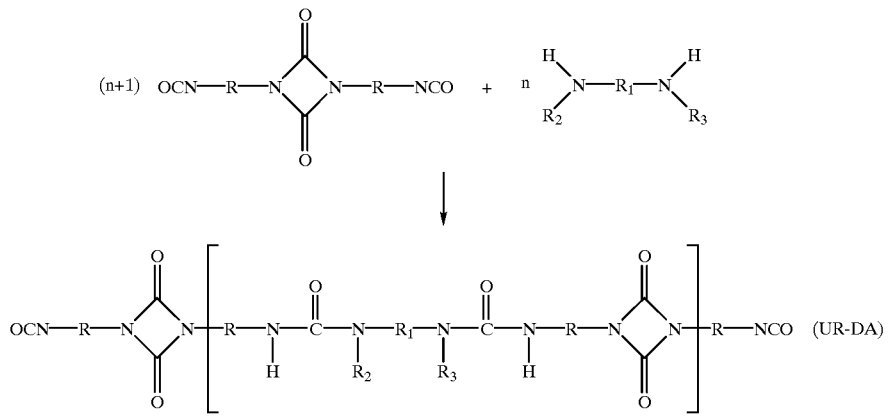

where the free NCO groups of the UR-DA can, if desired, be reacted in whole or in part with a blocking agent B-H and the substituents are defined as above.

The compounds of the invention feature a content of free NCO groups of 0–5%, preferably 0.1–2%, an overall NCO content (free+latent NCO groups) of 10–18%, preferably 12–17%, a uretdione group content of 1.2–2.1 mmol/g and a content of blocked NCO groups of 0–1 mmol/g. Their melting point varies within the range from 120–180° C., preferably 140–170° C. They are outstandingly suitable for preparing PU powder coatings.

The uretdione employed in the invention is the IPDI uretdione as described in DE A 30 30 513 and 37 39 549, having a free NCO content of 17–18%; in other words, more or less high proportions of the polyuretdione of IPDI must be present in the reaction product. The monomer content is ≦1%. The overall NCO content of the IPDI uretdione after heating at 180–200° C. (0.5 h) is 37.5–37.7%.

The diamines employed to prepare the product of the invention are mixtures of diprimary, primary/secondary and disecondary diamines. The diamines having one primary and one secondary amino group are prepared in two stages, the 1$^{st}$ stage comprising condensing the diprimary diamine with an aldehyde or ketone to give the Schiff base and the 2$^{nd}$ stage subjecting the Schiff base to hydrogenation and fractional distillation. To minimize byproduct (DI-Schiff base) it is necessary to operate with a large excess of diamine; in general, 10 mol of diamine are reacted with one mol of carbonyl compound. In principal, all aliphatic and cycloaliphatic diamines are suitable for condensation to the Schiff base, examples being ethylenediamine, 1,2-diaminopropane, 2-methylpentamethylenediamine, hexamethylenediamine, 2,2,4-(2,4,4)-trimethylhexamethylenediamine, isophoronediamine, 1,2-diaminocyclohexane and 1,3-bis(aminomethyl)benzene. Suitable carbonyl compounds which can be employed to prepare the Schiff base include in principle all (cyclo) aliphatic aldehydes and ketones; preference, however, is given to using isobutyraldehyde, 2-ethylhexanal, methyl isobutyl ketone, methyl ethyl ketone, diisobutylketone, cyclohexanone and 3,5,5-trimethylcyclohexanone. A preferred primary/secondary diamine is 5-amino-N-(1,3-dimethylbutyl)- 1,3,3-trimethylcyclohexanemethanamine.

A further variant comprises using diamines prepared by reacting diprimary diamines with acrylic esters such as, for example, methyl, ethyl, butyl, t-butyl or 2-ethyl-hexyl acrylate. The reaction of the diamine with the acrylic ester takes place at 60–80° C. in a molar ratio of 1:1. Preferably employed are hydrogenated cyano-ethylated monoamines such as N-methyl-1,3 -propanediamine, and particularly preferred is the hydrogenation product of acetonin (4-isopropylamino-2-amino-2-methyl-pentane).

Suitable disecondary diamines for the invention can be prepared in principle by the same two-stage process as described above. In the condensation, one mole of aldehyde or ketone is employed per mole of amino group. A preferred disecondary diamine is N,N'-bis(1,3-dimethylbutyl)-1,3,3-trimethylcyclohexane-methane-1,5-diamine.

The polyaddition products of the invention may be in partially or totally blocked form. The blocking agents include monoalcohols such as methanol, ethanol, butanol or 2-ethylhexanol, for example, or primary or secondary monoamines, such as butylamine, 2-ethylhexylamine, dibutylamine, di-2-ethylhexylamine and methylcyclohexylamine, for example.

The polyaddition compounds of the invention are prepared by the process which will now be described. The preparation takes place in two successive stages, where 1. in the 1$^{st}$ stage IPDI uretdione is reacted with the mixture of diprimary, primary/disecondary and disecondary diamines and
2. then in the 2$^{nd}$ stage the remaining NCO groups are reacted if desired with the blocking agent.

The reaction of stages 1 and 2 takes place in solution, the solvent being selected from the group consisting of aromatic hydrocarbons, esters or ketones, such as toluene, ethyl or butyl acetate, acetone, methyl ethyl ketone, methyl isobutyl ketone and any desired mixtures of these solvents. Acetone is a preferred solvent. The compounds of the invention are prepared by metering the diamine mixture into the acetone solution of the IPDI uretdione at room temperature at a rate such that the temperature of the reaction solution does not exceed 40° C. Upon completion of the addition of diamine, the reaction is terminated. Subsequently, the acetone is removed by distillation if the reaction product is still to comprise free NCO groups. If, however, the reaction product is not to contain any free NCO groups, there follows the reaction with the blocking agent. In the case of the monoamines this is possible at room temperature, the reaction being at an end following the addition of the monoamine in portions. Should the blocking agents comprise monoalcohols, blocking is carried out at 60° C. in the presence of 0.01–0.2% by weight of dibutyltin dilaurate (DBTL).

The present invention additionally provides polyurethane powder coating materials which comprise the polyaddition compounds of the invention in combination with hydroxyl-containing polymers for producing matte surfaces.

Suitable polyol components for preparing the PU powder coating materials of the invention include in principle all hydroxyl-containing polymers such as epoxy resins or hydroxy-acrylates, for example. Preference is given, however, to hydroxyl-containing polyesters having an OH functionality of 3–6, an average molecular weight of 1800–5000, preferably 2300–4500, an OH number of 25–140 mg of KOH/g, preferably 30–90 mg of KOH/g, and a melting point of $\geq 70$ to $\leq 130°$ C., preferably $\geq 75$ to $\leq 1$ 10° C. OH-containing polyesters of this kind, as are prepared in a known manner by condensing polyols and polycarboxylic acids, are described, for example, in DE-A 27 35 497 and 30 04 903.

To prepare the ready-to-use powder coating materials, the OH-containing polymer and the polyaddition compounds of the invention are mixed, with or without pigments, such as $TiO_2$, and/or leveling agents, such as polybutyl acrylate, on extruders or kneaders at temperatures between 80–140° C. such that there are 0.6 to 1.2, preferably 0.8–1.1, blocked NCO groups per OH group of the hydroxyl-containing resin.

The powder coating materials prepared in this way can be applied by the customary powder application techniques, such as electrostatic powder spraying or fluidized-bed sintering, to the moldings that are to be coated. The coatings are cured by heating at temperatures of 170 to 220° C. Matte, flexible coatings are obtained having outstanding anticorrosion properties and excellent thermal stability. In comparison with the PU powder coating materials known to date, based on blocked polyisocyanates, the PU powder coating materials of the invention are notable for the matte appearance of the coatings, with the degree of mattness being variable within a wide range.

Having now generally described the invention, a further understanding can be obtained by reference to certain specific examples which are provided herein for purpose of illustration only and are not intended to be limiting unless otherwise specified.

EXAMPLES

A) Starting compounds for the curing component
I. NCO component

The NCO component employed was an IPDI uretdione having an NCO content of 17.6% and an IPDI content of 1%. The NCO content of the IPDI uretdione after heating at 180° C. (1 h) was 37.5%.

II. Diamines as chain extenders

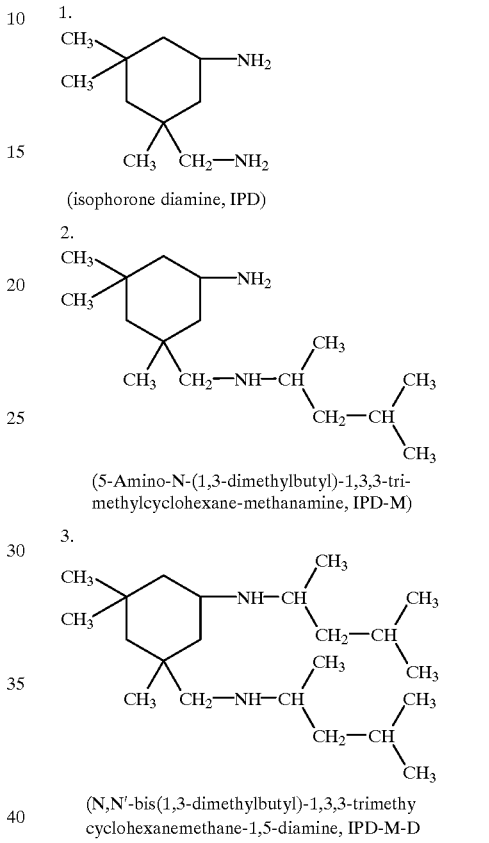

1.
(isophorone diamine, IPD)

2.
(5-Amino-N-(1,3-dimethylbutyl)-1,3,3-trimethylcyclohexane-methanamine, IPD-M)

3.
(N,N′-bis(1,3-dimethylbutyl)-1,3,3-trimethy cyclohexanemethane-1,5-diamine, IPD-M-D)

B) General instructions for preparation of the polyaddition compounds of the invention The diamine mixture is metered at room temperature into the acetone solution of the IPDI uretdione at a rate such that the temperature of the reaction solution does not exceed 40° C. After the end of the addition of the diamine the reaction is terminated. The acetone is subsequently removed by distillation. The reaction product still contains free NCO groups.

The compounds set out in Table I below were prepared by the general instructions of preparation.

TABLE 1

| | Polyaddition compounds of the invention | | | | | | |
|---|---|---|---|---|---|---|---|
| | | Composition [mol] | | | NCO content, | NCO content, | |
| Ex. No. | IPDI uretdione | IPD | IPD-M | IPD-M-D | free [% by mass] | overall [% by mass] | Melting range [° C.] |
| B.1 | 10 | 2.25 | 4.5 | 2.25 | 0.8 | 13.5 | 158–161 |
| B.2 | 10 | 2.03 | 5.11 | 1.86 | 1.1 | 14.6 | 153–156 |
| B.3 | 10 | 1.92 | 4.87 | 2.21 | 1.1 | 14.6 | 155–158 |
| B.4 | 10 | 1.75 | 7.00 | 0.2 | 0.6 | 13.6 | 167–170 |

C) Polyol component

The OH component employed to prepare the PU powders of the invention was the polyester ALFTALAT® AN 739 (Hoechst, Italy) having an OH number of 55–60 mg of KOH/g, an acid number of from 2–4 mg of KOH/g, a melting point of 82–90° C. and a viscosity at 160° C. of 24–29,000 mPa s.

D) Preparing the powder coating materials of the invention

General instructions for preparation

The ground products—IPDI uretdione/diamine adduct, polyester, leveling agent and white pigment—are intimately mixed in an edge runner mill and the mixture is then homogenized in an extruder at 80–140° C. After cooling, the extrudate is fractionated and ground using a pinned-disk mill to a particle size <100 μm. The powder prepared in this way is applied using an electrostatic powder spraying unit at 60 kV to degreased and optionally pretreated iron panels which are then stoved in a circulating-air drying cabinet at 200° C. for 15 minutes.

The curing agent was mixed with the polyol in an NCO:OH ratio of 1:1. Additives were:

40.0% by weight of KRONOS 2160
1.0% by weight of RESIFLOW PV 88
0.5% by weight of benzoin The abbreviations in Table 2 below have the following meanings:

LT=Layer thickness in μm
EI=Erichsen indentation in mm (DIN 53 156)
GG 60°◁=Gardner gloss measurement (ASTM-D 523)
BI dir.=Direct ball impact in inch lb.

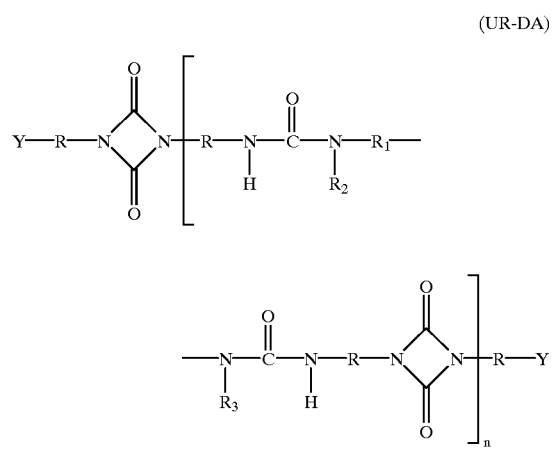

(UR-DA)

wherein the substituents are defined as follows:

Y:

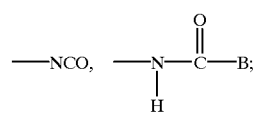

-continued

B:

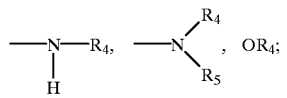

R:

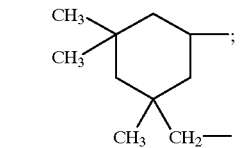

TABLE 2

| Pigmented powder coating materials | | | | |
|---|---|---|---|---|
| Example D Composition | 1 | 2 | 3 | 4 |
| Crosslinker to acc. to B. | 1 | 2 | 3 | 4 |
| Polyester | ALFTALAT ® AN 739 | ALFTALAT ® AN 739 | ALFTALAT ® AN 739 | ALFTALAT ® AN 739 |
| | The powder coating materials consist of equivalent amounts of cross-linker and polyester; in addition they contain 40% by weight of white pigment KRONOS 2160), 1% by weight of RESIFLOW PV 88 and 0.5% by weight of benzoin. | | | |
| Coatings data | | | | |
| LT | 48–73 | 43–62 | 72–77 | 56–80 |
| GG 60°◁ | 10 | 13 | 14 | 21 |
| EI | 1.5 | 1.5 | 1.0 | 1.5 |
| BI dir. | 60 | 50 | 50 | 50 |

Notes:
Curing conditions 200° C./15 minutes

The disclosure of German application serial number 19816547.1 filed Apr. 15, 1998 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A urea- and uretdione-finctional polyaddition compound having free, partially or totally blocked isocyanate groups and having the following structure:

-continued n:

1–20;

n: 1–20;
R₁ is R or a linear, branched or cyclic alkylene or phenylene radicals having 2–16 carbon atoms;
R₂, R₃ are each H, R₄ or a

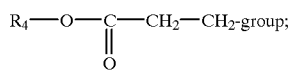

R₄—O—C(=O)—CH₂—CH₂-group;

R₄, R₅ are each identical or different hydrocarbon radicals having 1–14 carbon atoms;
prepared by reacting isophorone diisocyanate-uretdione with diamine mixtures comprising 1–60 mol % diprimary diamines, 1–98 mol % primary/secondary diamines and 1–98 mol % disecondary diamines.

2. The polyaddition compound as claimed in claim 1, wherein said diprimary diamines are aliphatic and/or cycloaliphatic diamines.

3. The polyaddition compound as claimed in claim 1, wherein said primary/secondary diamines are hydrogenated 1:1 reaction products of diprimary diamines and aldehydes.

4. The polyaddition compound as claimed in claim 1, wherein said primary/secondary diamines are hydrogenated 1:1 reaction products of diprimary diamines and ketones.

5. The polyaddition compound as claimed in claim 1, wherein said primary/secondary diamines are 1:1 reaction products of diprimary diamines and acrylic esters.

6. The polyaddition compound as claimed in claim 1, wherein said disecondary diamines are hydrogenated 1:2 reaction products of diprimary diamines and aldehydes.

7. The polyaddition compound as claimed in claim 1, wherein said disecondary diamines are hydrogenated 1:2 reaction products of diprimary diamines and ketones.

8. The polyaddition compound as claimed in claim 1, wherein said disecondary diamines are 1:2 reaction products of diprimary diamines and acrylic esters.

9. The polyaddition compound as claimed in claim 1, wherein said diprimary diamines are ethylenediamine, 1,2-diaminopropane, 2-methylpentamethylenediamine, hexamethylenediamine, 2,2,4-(2,4,4)-trimethylhexamethylenediamine, isophoronediamine or 1,2-diaminocyclohexane, alone or in mixtures.

10. The polyaddition compound as claimed in claim 3, wherein said aldehydes are isobutyraldehyde and 2-ethylhexanal.

11. The polyaddition compound as claimed in claim 4, wherein said ketones are methyl isobutyl ketone, methyl ethyl ketone, diisobutyl ketone, cyclohexanone and 3,5,5-trimethylcyclohexanone.

12. The polyaddition compound as claimed in claim 5, wherein said acrylic esters are methyl acrylate, ethyl acrylate, butyl acrylate, t-butyl acrylate and 2-ethylhexyl acrylate, alone or in mixtures.

13. The polyaddition compound as claimed in claim 1, wherein said primary/secondary diamines are 5-amino-N-(1,3-dimethylbutyl)-1,3,3-trimethylcyclohexanemethanamine (IPD-M), N-methyl-1,3-propanediamine and/or 4-isopropylamino-2-amino-2-methylpentane.

14. The polyaddition compound as claimed in claim 1, wherein said disecondary diamine is N,N'-bis(1,3-dimethylbutyl)-1,3,3-trimethylcyclohexanemethane-1,5-diamine (IPD-M-D).

15. The polyaddition compound as claimed in claim 1, wherein monoalcohols, primary and secondary monoamines are employed as blocking agents.

16. The polyaddition compound as claimed in claim 15, wherein said partially or fully blocked isocyanate is blocked with a monoalcohol selected from the group consisting of methanol, ethanol, butanol and 2-ethylhexanol.

17. The polyaddition compound as claimed in claim 15, wherein said monoamine is butylamine, 2-ethylhexylamine, dibutylamine, di-2-ethylhexylamine or methylcyclohexylamine.

18. The uretdione-functional polyaddition compound as claimed in claim 1, which has a content of free NCO groups of 0–5%, an overall NCO content of 10–18%, a uretdione group content of 1.2–2.1 mmol/g, a content of blocked NCO groups of 0–1 mmol/g and a melting range of 120–180° C.

19. The process for preparing a polyaddition compound as claimed in claim 1, which comprises first reacting IPDI uretdione with the mixture of diprimary, primary/disecondary and disecondary diamines and subsequently reacting the remaining free NCO groups with the blocking agent.

20. A transparent or pigmented polyurethane powder coating material, comprising:
a polyaddition compound as claimed in claim 1 in combination with hydroxyl-containing polymers.

21. The transparent or pigmented polyurethane powder coating material as claimed in claim 20 in combination with polyesters, epoxy resins and/or hydroxyacrylates.

22. The transparent or pigmented polyurethane powder coating material as claimed in claim 21, wherein polyesters having an OH functionality of 3–6, an average molecular weight of 1800–5000, an OH number of 25–140 mg of KOH/g and a melting point of 70 to ≦130° C. are hydroxyl-containing polymers.

23. The transparent or pigmented polyurethane powder coating material as claimed in claims 20, wherein the uretdione-finctional polyaddition compound in combination with hydroxyl-containing polymers comprises further auxiliaries and additives.

24. The transparent or pigmented polyurethane powder coating material as claimed in claim 20, wherein the material has an OH/NCO ratio of from 1:0.6 to 1:1.2.

* * * * *